United States Patent [19]

Harrison

[11] 4,269,250

[45] May 26, 1981

[54] RUBBER COMPOSITION HAVING IMPROVED ADHESION TO METAL CORD

[75] Inventor: John G. Harrison, Akron, Ohio

[73] Assignee: The Goodyear Tire & Rubber Company, Akron, Ohio

[21] Appl. No.: 27,570

[22] Filed: Apr. 6, 1979

Related U.S. Application Data

[63] Continuation of Ser. No. 781,244, Mar. 25, 1977, abandoned.

[51] Int. Cl.³ ................................................ B60C 9/02
[52] U.S. Cl. .................................. 152/358; 260/4 R; 260/42.32; 260/42.33; 260/775; 428/244; 428/256; 428/263; 428/379; 428/390; 428/465; 525/343; 525/535
[58] Field of Search ............... 428/256, 263, 379, 382, 428/462, 465, 244, 260, 461, 356, 390; 260/4 R, 775, 42.33, 42.32; 525/354, 343, 535; 152/357 R, 358, 359

[56] References Cited

FOREIGN PATENT DOCUMENTS 1144634 3/1969 United Kingdom .

OTHER PUBLICATIONS

Kovac, "Tire Technology", 1973–Goodyear Tire Rubber Co., p. 30.
Bucham, "Rubber to Metal Bonding", 1948, London–Croseley Lockwood & Son Ltd., pp. 76–81.
Murray et al., "The Neoprenes", 1963, Dupont de Nemours & Co., p. 74.
Rubber World, Compounding Ingredients for Rubber, 3rd Ed., 1961, p. 104.

Primary Examiner—James J. Bell
Attorney, Agent, or Firm—H. C. Young, Jr.

[57] ABSTRACT

Effective bonding of a vulcanized composite of rubber to a brass coated steel cord is improved by the addition of small amounts of an organic polymer which contains polysulfide linkages in the backbone of the polymeric chain. Under conditions where heat and water ordinarily decrease the adhesion of the composite, rubber compounds with small amounts of the polysulfide have considerably increased adhesion to brass-plated steel cord.

15 Claims, No Drawings

RUBBER COMPOSITION HAVING IMPROVED ADHESION TO METAL CORD

This is a continuation of application Ser. No. 781,244, filed Mar. 25, 1977, now abandoned.

BACKGROUND OF THE INVENTION

The present invention concerns an improved method for adhering brass and brass-plated metal to rubber. It also concerns a new class of rubber compounds having improved adhesion characteristics to brass-plated metal.

The problem of securing adequate adhesion of rubber to metal has been investigated extensively by those skilled in the various aspects of rubber manufacturing. The best known reference on this subject, Buchan, *Rubber Metal Bonding* (Crosby, Lockwood & Son, London, 1948) describes the now widespread practice of vulcanization of rubber onto a brass-plated metal substrate. The use of bonding agents such as isocyanates, rubber halogens, and thermoplastics, between the metal and the rubber is found in some applications.

The alteration of the rubber compound itself to improve its adhesion to the metal substrate has been considered, and one such alteration is disclosed in Canadian Pat. No. 793,794. An acidic compound and a free radical curing system is incorporated into rubbers and rubbery copolymers under the teachings of the Canadian patent.

Compounds of various rubbers, natural and synthetic, with small amounts of certain polymeric polysulfides, are described in British Pat. No. 1,144,634. Advantages taught in the British patent are reduced sulfur requirement, ease of compounding, and nonblooming vulcanizates.

The adhesion of polysulfides to metals (aircraft fuel tanks) is mentioned in U.S. Pat. No. 3,099,643, and their use as a cold setting adhesive for glass, wood and metals is discussed in Jorczak and Fettes, "Polysulfide Liquid Polymers," *Industrial and Engineering Chemistry*, Vol. 43, pp. 324, 327 (February, 1951).

SUMMARY OF THE INVENTION

The objects of this invention are: (1) to provide an improved method of adhering rubber compounds to brass-plated metal substrates; and (2) to provide a metal reinforced rubber compound with improved adhesion. Other objects will become apparent as the description proceeds.

The above stated objects are realized through the use of rubber compounds containing small amounts of polysulfide polymers.

For purposes of this application, the term "polysulfide polymer" is defined to mean any organic elastomeric polymer containing polysulfide linkages in the polymeric chain. This class of polymers includes but is not limited to Thiokols, sulfur modified polychloroprenes, and sulfur containing polymers of diene monomers alone or copolymerized with one or more other polymerizable unsaturated compounds as described in U.S. Pat. No. 2,234,204. A more detailed description of these polymers follows.

Thiokols are polymers obtained by the reaction between polysulfides of an alkali metal (e.g. sodium polysulfide) and one or more organic dihalides (e.g. ethylene dichloride). Other monomers such as trichloropropane may be incorporated into the polysulfides in minor amounts. They are available commercially in several varieties of solid and liquid polymers.

The particular Thiokols utilized in the development of this invention are representative of polysulfide polymers commercially available. Their precise chemical composition is unknown to this applicant, and the molecular structures given may be subject to slight variations having little, if any, effect on their properties. They are as follows:

Thiokol A—a reaction product of sodium tetrasulfide and ethylene dichloride having the segmental molecular structure $-CH_2CH_2S_4-)_n$. A more detailed description can be found in U.S. Pat. Nos. 1,890,191; 1,923,392 and Re. 19,207. U.S. Pat. No. 1,890,191 defines the polymer as a product comprising a compound composed of not less than 70 percent sulfur in chemical combination with $C_nH_{2n}$ groups corresponding to olefins having less than four carbon atoms, the percent being weight percent.

Thiokol FA—a copolymer of ethylene dichloride, sodium polysulfide and bis(2-chloroethyl)formal with hydroxyl end groups. Copolymers of organic dihalides (e.g. ethylene dichloride and bis(2-chloroethyl)formal) are disclosed in U.S. Pat. Nos. 2,363,614 (Example 7 and page 10, column 1, lines 3 to 7 and 34) and 2,363,615. The fact that they contain hydroxyl terminals is discussed in Fettes and Jorczak, "Polysulfide Polymers," *Industrial and Engineering Chemistry*, Vol. 42, pp. 2217, 2218, (November, 1950) and in U.S. Pat. No. 2,606,173.

Except for the hydroxyl end groups, these copolymers are defined in U.S. Pat. No. 2,363,614, as a copolymer which is substantially a chemical combination of a polymer of the unit $[RS_{1\ to\ 6}]$ and a polymer of the unit $[R'S_{1\ to\ 6}]$, R and R' being radicals having structures selected from the groups

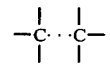

(representing carbon atoms separated by intervening structure) and

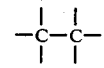

(representing adjacent carbon atoms) where R and R' have different specific structures. In the case of Thiokol FA, R is $-C_2H_4-$, and R' is $-CH_2CH_2OCH_2OCH_2CH_2-$.

Thiokol ST—a copolymer of sodium polysulfide, bis(2-chloroethyl)formal, and trichloropropane (which produces branching in the polymer chains) with thiol end groups. U.S. Pat. No. 2,363,614 (at page 8 to page 11, right column, line 56) reveals the copolymerization of 1,2,3-trisubstituted propane with disubstituted diethyl formal in a solution of sodium tetrasulfide. Such a polymerization is described in detail in Examples I and XI of U.S. Pat. No. 2,466,963. The reductive cleavage reaction revealed in U.S. Pat. No. 2,466,963 is, according to Bertozzi, "Chemistry and Technology of Elastomeric Polysulfide Polymers," *Rubber and Chemistry Technology*, Vol. 41, pp. 114, 116 (February, 1968), used in the synthesis of Thiokol ST elastomer.

Thiokol ST is comprised of the same generic type of polymer units which Thiokol FA is comprised of with the further limitations that the sulfide linkages are disulfide linkages, R is the unit

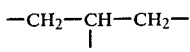

and R' is the unit —CH$_2$CH$_2$OCH$_2$OCH$_2$CH$_2$—.

Liquid Thiokols such as Thiokol LP-31—a liquid copolymer of bis(ethylene oxy)methane groups and polysulfide linkages with thiol end groups, having the general structure:

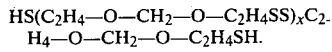

LP-31 has a molecular weight of approximately 8000. Other LP-type polymers have molecular weights ranging from approximately 500 to 4000. Molecular weights for a liquid polysulfide can be as high as 50,000 (as opposed to 100,000 to 200,000 for most solid polysulfides such as Thiokol A and FA) according to U.S. Pat. No. 2,875,182. The preparation of liquid LP-type polymers is described in Example XVII of U.S. Pat. No. 2,466,963 and in U.S. Pat. No. 2,875,182, Example 6.

In U.S. Pat. No. 2,466,963, LP-type polymers are described as polythiopolymercaptans in a liquid form at ordinary temperatures (e.g. 25° C.) comprising a series of segmeric units having the general formula —SRS— linked together to form a polymer wherein R is a radical having a structure selected from the group consisting of

designating a single carbon atom,

designating two adjacent carbon atoms, and

designating two carbon atoms joined to and separated by intervening structure. In the case of Thiokol LP-31, R is one of the last type of radical, in particular

The words "Thiokol LP," "Thiokol FA," "Thiokol A" and "Thiokol ST" are trademarks of Thiokol Chemical Corporation.

Sulfur modified polychloroprenes are described in U.S. Pat. No. 1,950,439. That patent describes sulfur and certain thiuram disulfides as catalysts for controlling the type of polychloroprene produced, maximizing yields, and controlling reaction rate. However, it was later discovered that the sulfur actually becomes part of the polymer itself [see Mochel, W. E., "Structure of Neoprene," *Journal of Polymer Science,* Vol. VIII, pp. 583–592 (1952) and Klebanskii et al, *J. Polym. Sci.,* Vol. 30, pp. 363–373 (1958)].

From a reading of the above references, sulfur modified polychloroprenes can be defined as the class of polymers obtained by polymerization of 2-chloro-1,3-butadiene in the presence of sulfur or thiuram disulfides as listed in U.S. Pat. No. 1,950,489, page 2, column 2, lines 2 through 7.

U.S. Pat. No. 2,234,204 describes sulfur containing polymers of "butadiene hydrocarbons" (defined at page 3, column 2, lines 1 through 8, which is incorporated by reference into this specification). The "butadiene hydrocarbons" may be used alone, in admixture with each other, or with one or more other polymerizable unsaturated organic compounds, examples of which are given at page 3, column 2, lines 17 through 35, which is incorporated by reference into this specification. Sufficient examples are included in U.S. Pat. No. 2,234,204 to illustrate this class of polymer. Typical of the class is the polymer containing 100 parts by weight of 1,3-butadiene, 50 parts by weight of acrylonitrile, and 0.6 parts by weight of sulfur (Example No. 7 in the patent referred to).

The term "polysulfide polymer" also includes those polymers of U.S. Pat. No. 3,373,146 having polysulfide linkages in the polymer chain. This patent discloses low molecular weight (usually 500 to 10,000) mercaptan terminated copolymers of sulfur and at least one diene monomer. The definition of these polymers is found at column 2, lines 17 through 31 of the reference patent.

The preceding descriptions of polysulfide polymers are not intended to be all-inclusive or limiting but are merely illustrative.

Also, the term "compound" as used herein means the composition of matter formed by combining one or more rubbery polymers selected from the group consisting of natural rubber, synthetic diene rubber, and polysulfide polymer with conventional compounding ingredients, which ingredients typically include plasticizer, fatty acid, vulcanizing agent, accelerator, age resistors, lubricant, and reinforcing filler.

In the practice of this invention, the rubber is mixed in the conventional manner, for example, on a mill or in a Banbury, with the usual compounding ingredients (e.g. carbon black, processing oil, zinc oxide, fatty acid, sulfur, accelerator, antioxidant, antiozonant, plasticizer, and wax). From 0.1 to 10.0 volume percent of the polymeric content (i.e. the natural rubber, polyisoprene, etc.) is a polysulfide polymer, and the concentration of sulfur normally in the mixture can be decreased. The resulting vulcanizable compound is pressed onto the metal substrate (e.g. brass-plated steel wire) which operation can be done on a rubber calender.

Various other operations (which depend upon the desired end product) follow. For example, tire carcass stock is cut and combined with other rubber components (e.g. bead, tread stock, and sidewalls) on a tire building machine.

These operations are followed by molding and curing under controlled pressure and temperature.

The principal benefit derived from the incorporation of polysulfide polymer into the rubber compound is an increase in the adhesion of the brass-plated metal substrate to the rubber in aged samples. In experiments, the adhesion between the metal and the rubber in the modified samples is 1.4 to 3.9 times that of unmodified stock.

There are other benefits incidental to the substitution of polysulfide polymers for other rubber. When they are used in natural rubber stocks they reduce the tendency to reversion as shown in Rheometer tests. Experiments with natural rubber have shown that the amount of sulfur can be reduced, and heat build-up in the rubber on flexing is reduced.

DESCRIPTION OF THE PREFERRED EMBODIMENTS

The technique and materials of this invention are useful in any application wherein the bonding of rubber to brass-plated metal or brass is important. They are particularly advantageous in the manufacture of tire carcass stock. The term "carcass" refers to the fabric-reinforced parts of the tire also called body plies and belt. A typical application of wire reinforced rubber is the belt ply which is between the radial plies and tread in a steel-belted radial tire.

Because tires are subject to many varying stresses under a wide range of temperatures, adhesion of the carcass rubber to its reinforcement is critical. Tires which are retreaded many times such as truck and earthmover tires require a durable carcass to outlast several tread applications.

Any sulfur vulcanizable natural or synthetic rubber may be utilized with polysulfide polymers in manufacturing compounds of this invention. The rubbers typically used include natural rubber (e.g. smoked sheet) and diene rubbers such as SBR, solution polybutadiene, emulsion polybutadiene, synthetic polyisoprene, ethylene propylene dicyclopentadiene terpolymer, and blends of the above.

The preferred amount of polysulfide is dependent upon the type of polymer to be utilized in the compound, the type of polysulfide and the condition for which the end product is designed. However, it has been found that volume percents ranging from 0.5 to 7.4 percent polysulfide are preferred.

Processing of the stock is the same as is normally done without the polysulfide polymer with certain exceptions. Before adding polysulfide to the compound mixture when using Thiokol A, Thiokol FA or Thiokol ST, some rubber should be incorporated into the polysulfide (e.g. on a mill). It has been found that a preliminary milling of natural rubber with polysulfide in a weight ratio of 18 parts natural rubber to 10 parts polysulfide facilitates dispersion of the polysulfide into the compound and improves tensile strength and tear strength over stocks made without this prior mixing.

Also, as an aid in mixing of the polysulfide with the other ingredients of the compound, a masterbatch of carbon black and polysulfide polymer can be made using approximately 30 volumes of carbon black per 100 volumes of polysulfide. The carbon black and polysulfide masterbatch is easier to add to an internal mixer such as a Banbury, and it helps to insure an even distribution of carbon black throughout the compound.

In the case of Thiokol LP, prior mixing with carbon black or other rubber is unnecessary because the liquid Thiokols are easily incorporated into the composition.

The polysulfide or a masterbatch of polysulfide polymer with rubber or carbon black preferably should be added to the other compounding ingredients last, along with the sulfur. This practice helps to prevent scorch.

The following examples are presented not to limit but to illustrate the compounds and methods of this invention. Unless otherwise stated parts are parts by weight per 100 parts by weight of total polymer and percentages are volume percent of total polymer content.

Various vulcanized compounds have been manufactured experimentally and tested for original and aged adhesion and heat build-up. The method of measuring adhesion of brass plated metal to the compound was as follows: test specimens were prepared by curing in a mold a rectangular block of polymer compound with dimensions of 12 mm.×12 mm.×75 mm. into which had been embedded two brass plated steel cords, one at either end of the block. The mold was so designed that the wires were embedded axially and symmetrically, and insertion length of the wire into the block was always 19 mm. The wires did not go completely through the block nor did they touch each other.

Sufficient wire was left protruding from the ends of the block to allow placement of a sample in the jaws of a tensile tester such as a Scott tester or an Instron tester. The two jaws or clamps of the testing apparatus held the two wire ends. The rubber itself was not held. Force required to pull one of the wires out of the block was measured with a fixed jaw separation rate (5 cm. per minute was used). Heat build-up in a compound was measured by the Goodrich Flex Test, ASTM D623.

The compounds used in evaluating the effectiveness of the polysulfide polymers were natural rubber compounds designed for use in tire carcass stock. Where applicable, reduction in sulfur or total parts of sulfur used is shown in the data tables which follow.

EXAMPLE I

A standard natural rubber compound, which shall be referred to as Standard Compound A, was modified by replacing part of the natural rubber in the compound with varying amounts of Thiokol A and by varying the amount of sulfur used. Test results are shown in Table I. Adhesion test specimens were cured 85 minutes at 135° C.

TABLE 1

| Modifications of Standard Compound A | | | | | | |
|---|---|---|---|---|---|---|
| Natural Rubber | Vol. % | 100 | 95.6 | 94.4 | 92.6 | 92.6 |
| Thiokol A | Vol. % | 0 | 4.4 | 5.6 | 7.4 | 7.4 |
| Sulfur (parts) | | 6.5 | 5.5 | 5.5 | 5.5 | 4.0 |
| Adhesion (Original) in Newtons | | 483 | 562 | 403 | 492 | 501 |
| Adhesion (Aged 10 days in H$_2$O at 90° C.) in Newtons | | 203 | 697 | 763 | 783 | 698 |
| Temperature Rise, °C. in Goodrich Flex Test | | 36.4 | 34.2 | 32.8 | 33.1 | 34.2 |

All aged adhesions of the Thiokol stocks were approximately three times that of the control without Thiokol.

EXAMPLE II

The procedure followed in this example is similar to the previous example except that a different Standard Compound, Standard Compound B, was used, and lower concentrations of sulfur were tried. Thiokol A was again used as a substitute for a portion of the natural rubber content. Results appear in Table 2.

TABLE 2

Modifications of Standard Compound B

| | | | | | | |
|---|---|---|---|---|---|---|
| Natural Rubber | Vol. % | 100 | 95.6 | 94.4 | 92.6 | 92.6 |
| Thiokol A | Vol. % | 0 | 4.4 | 5.6 | 7.4 | 7.4 |
| Sulfur (parts) | | 5.0 | 4.0 | 4.0 | 3.5 | 2.25 |
| Adhesion (original) in Newtons | | 622 | 934 | 867 | 907 | 836 |
| Adhesion (aged 10 days in H$_2$O at 90° C.) in Newtons | | 448 | 687 | 690 | 710 | 647 |
| Temperature Rise, °C.) in Goodrich Flex Test | | 38.9 | 34.7 | 32.8 | 32.2 | 34.7 |

All original and aged adhesions of the Thiokol contaning stocks exceeded that of the control. As in the previous example, the Thiokol containing stocks demonstrated a lower heat rise than the control.

EXAMPLE III

An experiment was done at 2.1 volume percent polysulfide polymer in Standard Compound A with a portion of the carbon black in the compound replaced by Hi-Sil 233 (a hydrated silicate filler marketed by PPG Industries, Inc.) and at a reduced sulfur level. Tests were performed as in the previous two examples with the addition of an adhesion test on a sample aged 10 days in a nitrogen atmosphere at 121° C. and 551. Kilopascals gauge pressure. Results are reported in Table 3.

TABLE 3

Multivariable Study of Modifications of Standard Compound A

| | | Controls | | Stocks with Thiokols | | | |
|---|---|---|---|---|---|---|---|
| Natural Rubber | Vol. % | 100 | 100 | 97.9 | 97.9 | 97.9 | 97.9 |
| Thiokol Type A | " | 0 | 0 | 2.1 | 0 | 0 | 0 |
| Thiokol Type FA | " | 0 | 0 | 0 | 2.1 | 0 | 0 |
| Thiokol Type ST | " | 0 | 0 | 0 | 0 | 2.1 | 0 |
| Thiokol Type LP-31 | " | 0 | 0 | 0 | 0 | 0 | 2.1 |
| Carbon Black (parts) | | 65 | 58 | 58 | 58 | 58 | 58 |
| Hi-Sil 233 (parts) | | — | 8.25 | 8.25 | 8.25 | 8.25 | 8.25 |
| Sulfur (parts) | | 6.5 | 5.75 | 5.75 | 5.75 | 5.75 | 5.75 |
| Adhesion (Original) Newtons | | 440 | 479 | 585 | 420 | 513 | 537 |
| Adhesion (Aged 10 days in H$_2$O @ 90° C.) in Newtons | | 256 | 192 | 651 | 600 | 565 | 620 |
| Adhesion (aged 10 days in 551. kPag of Nitrogen @ 121° C.) in Newtons | | 395 | 373 | 606 | 603 | 612 | 564 |
| Temperature Rise (°C.) in Goodrich Flex Test | | 34.7 | 40 | 39.7 | 38.1 | 35 | 36 |

Original adhesion in three of the four Thiokol-containing stocks was improved over the controls, and aged adhesion of all the Thiokol-containing stocks was superior to the controls. Comparison of the two controls reveals that the use of Hi-Sil 233 filler produced greater heat rise in the Goodrich Flex Test. All of the Thiokol-containing stocks showed less heat rise than the control containing Hi-Sil.

Adhesion testing has also been done on compounds containing blends of natural rubber with solution polybutadiene and blends of natural rubber with SBR rubber. The original and aged adhesion test results for these blends demonstrated improved adhesion for compounds containing polysulfide polymer comparable to the data given above for natural rubber compounds.

The curing characteristics of several compounds of this invention were measured on an oscillating disk cure meter (ASTM D2084). Tests were run at 149° C. with a stock containing 3.7 volume percent Thiokol ST in Standard Compound A and at 135° C. with stocks containing 7 volume percent Thiokol A in Standard Compound A and varying concentrations of sulfur in the compound. In the tests at 7 volume percent Thiokol A sulfur content in the control was 6.5 parts while that in the polysulfide containing stocks varied from 4.0 to 5.5 parts. Although the natural rubber control stocks without polysulfide polymers exhibited a tendency to reversion, the stocks containing polysulfide polymers mixed with natural rubber did not.

Reversion is a decrease in measured torque or modulus after maximum torque has been reached. It is measured as the time required to fall to 98 percent of maximum torque after maximum torque has been reached.

Polysulfide containing stocks also exhibited a continuing vulcanization effect resulting in higher maximum torque than the controls and longer times to reach maximum torque. This phenomenon was true at all sulfur levels tested.

While certain representative embodiments and details have been shown for the purpose of illustrating the invention, it will be apparent to those skilled in this art that various changes and modifications may be made therein without departing from the spirit or scope of the invention.

What is claimed is:

1. In a composite vulcanizate of rubber and wire reinforcement therefore, where said rubber contains carbon black and sulfur and where said wire is selected from at least one of brass and brass-plated steel and is optionally woven, the improvements in which (A) said rubber composition comprises about 0.1 to about 10 volume percent polysulfide polymer, based upon the total polymeric content of the rubber composition, and (B) in the preparation of the rubber composition, a portion of the rubber is optionally premixed with said polysulfide polymer prior to mixing with the carbon black; where said rubber is selected from at least one of the group consisting of natural rubber, SBR rubber, polybutadiene, polyisoprene and ethylene/propylene/dicyclopentadiene terpolymer.

2. The composite of claim 1, the polymeric portion of which comprises a combination of natural rubber and a polysulfide polymer.

3. The composite as recited in claim 1, in which the polysulfide polymer constitutes from 0.5 to 7.4 volume percent of the total polymer content.

4. The composite according to claim 3 in which the polysulfide polymer is a polymer composed of not less than seventy weight percent sulfur in chemical combination with $C_nH_{2n}$ moieties corresponding to olefins having less than four carbon atoms.

5. The composite of claim 4 in which the polysulfide polymer has the segmental molecular structure —$CH_2CH_2S_4$—.

6. The composite according to claim 3 in which the polysulfide polymer is a copolymer comprised of a chemical combination of a polymer of the unit $RS_x$ and a polymer of the unit $R'S_x$, wherein R and R' are radicals having structures selected from the group consisting of

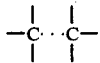

(representing carbon atoms, separated by intervening structure) and

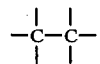

(representing adjacent carbon atoms), where R and R' have different specific structures, and x is 1 to 6.

7. The composite according to claim 6 in which R is —$C_2H_4$—, R' is —$CH_2CH_2OCH_2OCH_2CH_2$—, and the end groups are hydroxyl.

8. The composite according to claim 6 in which x is 2, R is

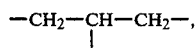

R' is —$CH_2CH_2$—O—$CH_2$—O—$CH_2CH_2$—, and the end groups are —SH.

9. The composite as recited in claim 3 in which the polysulfide polymer has a molecular weight of about 500 to 12,000, thiol end groups, and exists at 25° C. as a liquid which comprises a series of segmeric units having the formula —SRS— wherein R is a radical selected from the group consisting of methyl, ethyl, and

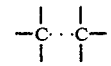

designating two carbon atoms joined to and separated by intervening structure.

10. The composite of claim 9 in which R is —$CH_2CH_2$—O—$CH_2OCH_2CH_2$—.

11. The composite of claim 3 in which the polysulfide polymer is a sulfur modified polychloroprene.

12. The composite of claim 3 in which the polysulfide polymer is prepared from a monomer system comprised of a butadiene hydrocarbon; a polymerizable unsaturated organic compound selected from the group consisting of styrene, divinyl acetylene, monovinyl acetylene, vinyl acetate, vinyl chloride, acrolein, acrylic acid, methacrylic acid, methyl methacrylate, acrylonitrile, methacrylic nitrite, and chloroprene; and sulfur.

13. The composite of claim 12 in which the polysulfide polymer is comprised of a polymer prepared from a monomer system comprised of 1,3-butadiene, acrylonitrile and sulfur.

14. The vulcanizate of claim 1 in the form of a tire carcass ply.

15. A pneumatic tire containing the carcass ply of claim 14.

* * * * *